(12) United States Patent
Faller

(10) Patent No.: US 11,760,327 B2
(45) Date of Patent: Sep. 19, 2023

(54) PNEUMATIC BRAKE BOOSTER

(71) Applicant: Continental Teves AG & Co. oHG, Frankfurt (DE)

(72) Inventor: Jürgen Faller, Kahl (DE)

(73) Assignee: Continental Teves AG & Co. OHG

(*) Notice: Subject to any disclaimer, the term of this patent is extended or adjusted under 35 U.S.C. 154(b) by 1165 days.

(21) Appl. No.: 15/577,072

(22) PCT Filed: May 10, 2016

(86) PCT No.: PCT/EP2016/060463
§ 371 (c)(1),
(2) Date: Nov. 27, 2017

(87) PCT Pub. No.: WO2016/188737
PCT Pub. Date: Dec. 1, 2016

(65) Prior Publication Data
US 2018/0170338 A1    Jun. 21, 2018

(51) Int. Cl.
*B60T 13/567* (2006.01)

(52) U.S. Cl.
CPC .................. *B60T 13/567* (2013.01)

(58) Field of Classification Search
CPC ..................................................... B60T 13/567
See application file for complete search history.

(56) References Cited

U.S. PATENT DOCUMENTS

| 4,307,570 A | 12/1981 | Yardley |
| 4,604,944 A | 8/1986 | Tsubouchi |
| 5,195,421 A * | 3/1993 | Shinohara ............ B60T 13/567 60/547.1 |
| 9,290,168 B2 * | 3/2016 | Son ........................ B60T 13/52 |
| 2004/0160119 A1 | 8/2004 | Wagner et al. |
| 2009/0199555 A1 | 8/2009 | Hatano |

FOREIGN PATENT DOCUMENTS

| DE | 9005629 U1 | 9/1991 |
| DE | 10022459 A1 | 11/2001 |
| EP | 0062268 A1 | 10/1982 |
| FR | 2443954 A1 | 7/1980 |
| JP | S619366 U | 1/1986 |
| JP | H09207757 A | 8/1997 |
| JP | 2009190425 A | 8/2009 |
| WO | 02098718 A1 | 12/2002 |

OTHER PUBLICATIONS

Notification of Reasons for Refusal for Japanese Application No. 2017-561745, dated Dec. 7, 2018, with translation, 9 pages.
International Search Report and Written Opinion for International Application No. PCT/EP2016/060463, dated Jul. 20, 2016, 9 pages.
Brazilian Office Action for Brazilian Application No. BR112017025218-0, dated Jul. 6, 2020 with partial translation, 6 pages.

* cited by examiner

*Primary Examiner* — Kenneth Bomberg
(74) *Attorney, Agent, or Firm* — RatnerPrestia

(57) ABSTRACT

In order to realize shortened response and release times in a pneumatic brake booster for a hydraulic motor vehicle brake system, having an operating chamber which is delimited between an operating wall and a rear wall of the booster housing, the rear wall of the booster housing has at least one formation for reducing the minimum volume of the operating chamber.

9 Claims, 3 Drawing Sheets

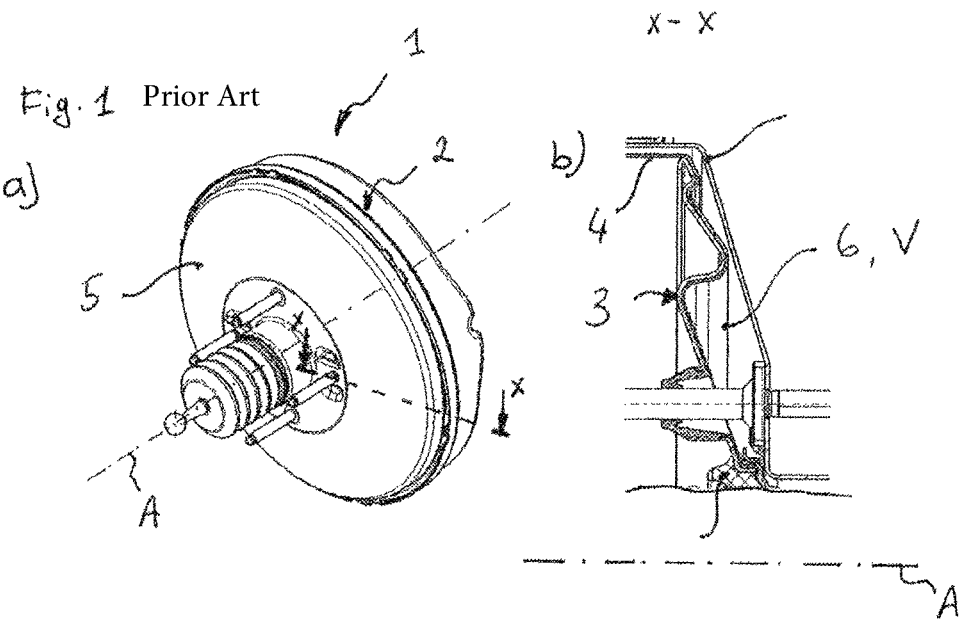
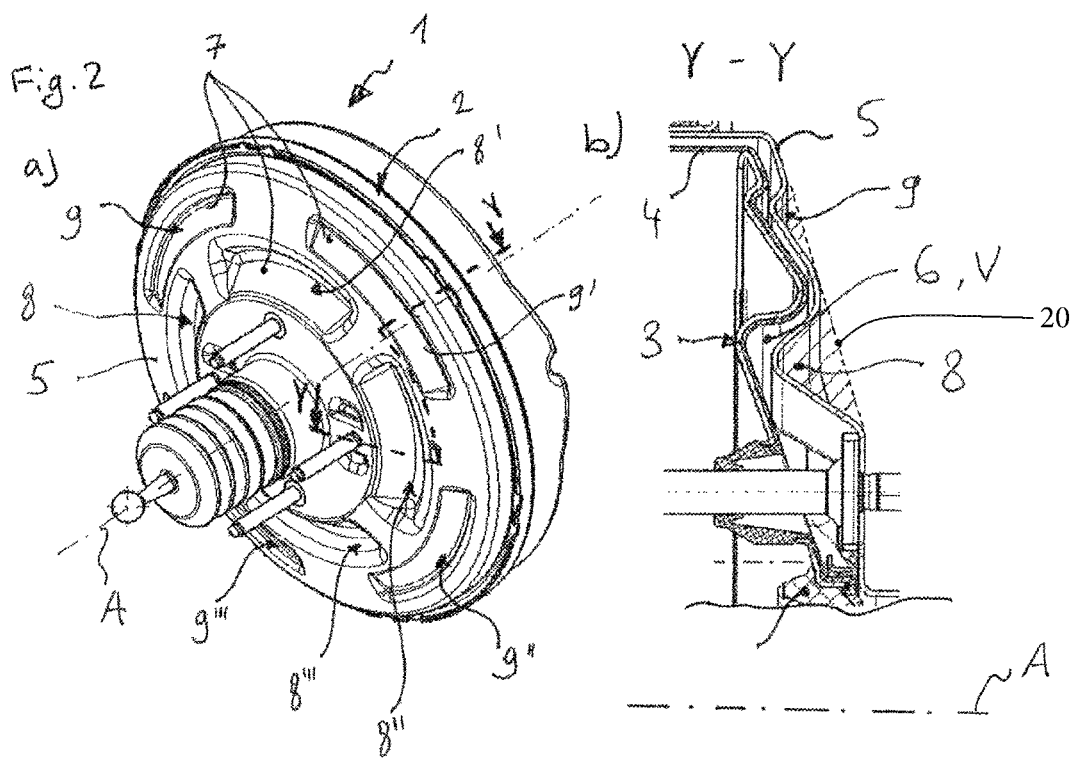

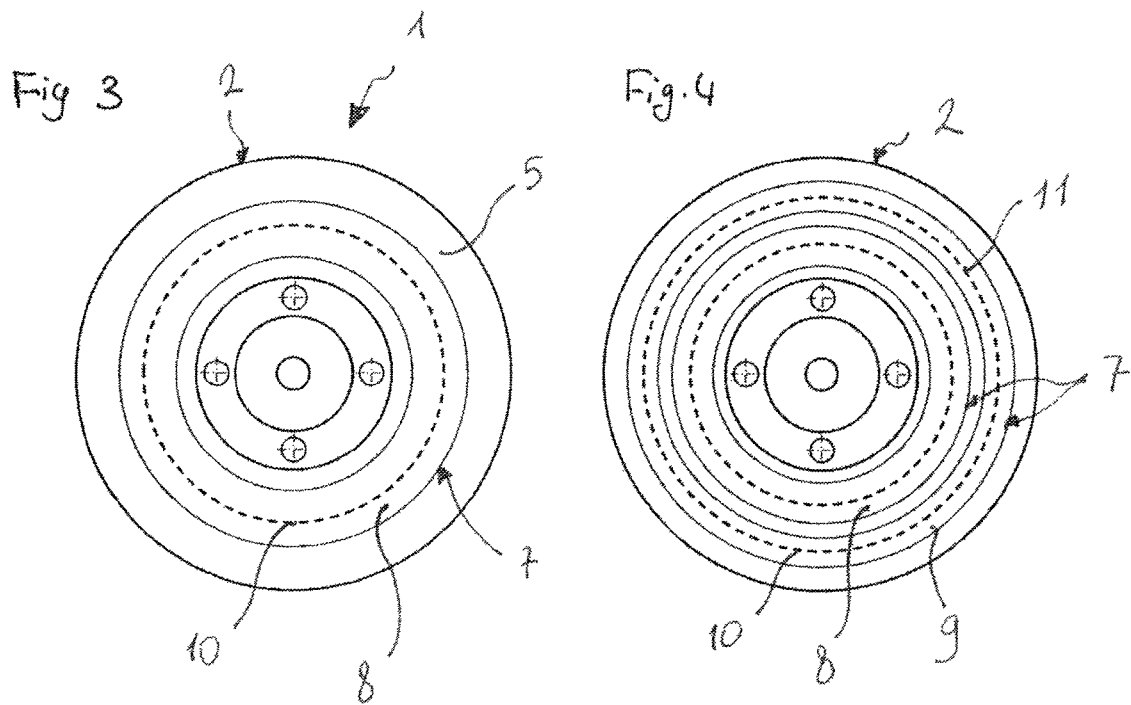
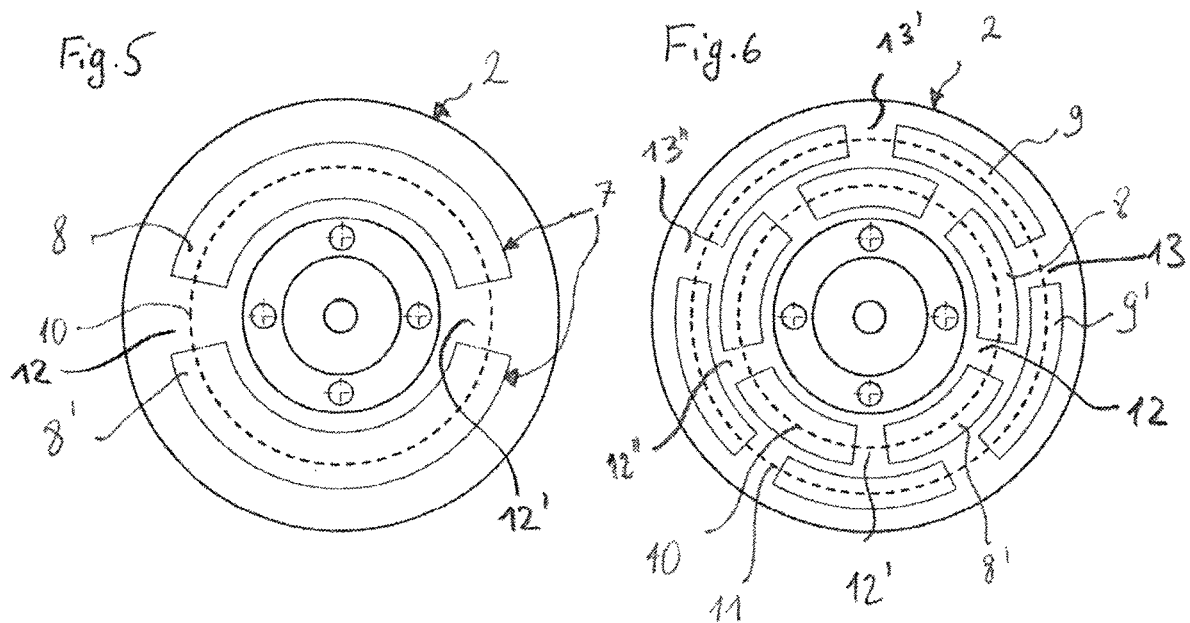

PNEUMATIC BRAKE BOOSTER

CROSS REFERENCE TO RELATED APPLICATIONS

This application is the U.S. National Phase application of PCT International Application No. PCT/EP2016/060463, filed May 10, 2016, which claims priority to German Patent Application No. 10 2015 209 788.9, filed May 28, 2015, the contents of such applications being incorporated by reference herein.

FIELD OF THE INVENTION

The invention relates to a pneumatic brake booster for a hydraulic motor vehicle brake system.

BACKGROUND OF THE INVENTION

Brake boosters of this type are widespread and configure vacuum chambers and operating chambers which are separated by way of a displaceable operating wall in the interior of the booster housing. Here, the booster effect is based on a pressure differential force which can be set and controlled between the two chambers, allows the operating wall to be displaced, and is subsequently transferred to a brake master cylinder which is connected downstream in the direction of action.

In the case of brake boosters of the generic type such as this, the inertia in the response behavior and in resetting into the brake-ready state is considered to be worthy of reduction, and an increased complexity and energy requirement during evacuation of the air are likewise criticized.

SUMMARY OF THE INVENTION

An aspect of the invention is therefore based on providing an improved brake booster of the type mentioned at the outset, in a manner which is as inexpensive as possible, which brake booster has shortened response and release times in addition to a reduced energy requirement for air evacuation.

An operating chamber is configured between the rear wall of the booster housing and the axially displaceable operating wall in the interior of said booster housing, which operating wall is of approximately cup-shaped design.

In the case of a non-actuated starting state of an operationally ready brake booster, the operating chamber is connected to a vacuum chamber which lies on the other side of the operating wall, with the result that an identical vacuum prevails in the two chambers. In the case of an actuation of the brake booster, said connection is interrupted and air from the atmosphere is let into the operating chamber, the boosting effect of the brake booster beginning only above a defined degree of filling of the operating chamber.

In the case of what is known as the release of the brake booster after a braking operation has ended and the associated return of the operating wall, the connection of the operating chamber to the atmosphere is interrupted again, and the air which has been let in is evacuated. Modern energy-efficient vehicle drives usually do not provide sufficient vacuum, with the result that the evacuation of the air has to take place by way of separate vacuum pumps with the consumption of energy and therefore a reduction in efficiency.

In order to have a rigidity which is sufficient for receiving and transmitting the pressure differential force, the operating wall is usually of undulating design in cross section, or is designed with a type of kinks, or at any rate is not of flat or simply conical design. As a result, the operating chamber has a not inconsiderable minimum volume (also called dead space or waste space) between the rear wall and the operating wall, even in the non-actuated starting state.

Said minimum volume or waste space is reduced in a very effective and cost-efficient manner by way of a formation which is preferably designed using forming technology on the rear wall of the booster housing and is directed in the direction of the operating wall, with the result that less atmospheric air is required to fill and to evacuate the operating chamber. As a result, the pressure differential force which is required for initiating a brake boosting operation is achieved more rapidly, and therefore the actuating time is reduced.

Less air likewise has to be evacuated out of the brake booster after a braking operation, and this reduces the energy requirement necessary to this end. The evacuation operation can proceed more rapidly or, for example, less powerful and therefore lighter and cheaper vacuum pumps can be used.

The formation can particularly advantageously and efficiently be designed as at least one indented portion in the rear wall, which indented portion can be produced, in particular, using forming technology and is directed toward the operating wall. As a result, no separate additional components and no additional process steps are required during the production of the booster housing, since merely the die which is incorporated into the production of the rear wall has to be modified.

In addition, the indented portion according to an aspect of the invention in the rear wall surprisingly brings about an advantageous stiffening of the booster housing. The wall thickness and weight of the booster housing can be reduced, and the bulging of the rear wall toward the outside during operation of the brake booster is reduced or avoided, whereby smaller spacings from the surrounding components in the engine compartment would have to be maintained, and the space requirement is reduced.

Furthermore, the indented portion can also make the production of the booster housing more effective, since said indented portion can be used, for example, for unambiguous positioning, as a stop or a positively locking anti-rotation safeguard and the like.

In one advantageous development, for a particularly favorable distribution of force in the booster housing and a particularly simple production capability, the indented portion can be designed so as to extend along at least one region of a circular path concentrically with respect to the center axis.

In a first embodiment according to an aspect of the invention, the formation can be produced particularly simply and can be configured in a particularly efficient way in relation to the volume reduction as a single contiguous circular indented portion.

In accordance with a further embodiment according to an aspect of the invention, however, a plurality of indented portions which are isolated from one another can be arranged along the circular path at a defined angular offset about the center axis from one another. As a result, a type of webs are formed between the individual indented portions, whereby the rear wall is stiffened to a relatively high extent and the flow of force is optimized further.

In one development of an aspect of the invention, the indented portions can be configured along two or more concentric circular paths which are spaced apart radially from one another. As a result, the cross-sectional profile of the rear wall can be approximated particularly effectively to the cross-sectional profile of the operating wall, and the volume reduction is therefore increased. The stiffness is also improved further, and the tendency to bulge of the rear wall is reduced.

In one particularly preferred embodiment according to an aspect of the invention, in each case four indented portions which are isolated from one another and are offset angularly in a uniform, in particular symmetrical, manner with respect to one another can be configured on each circular path. An adaptation to the position of the connecting elements can be carried out in a structurally particularly effective manner by way of the resulting homogeneous distribution of forces, as a result of which the wall thickness and the weight of the booster housing can be reduced further without a loss of stiffness.

In one particularly advantageous embodiment, the formation is designed and configured in such a way that the reduction in the minimum volume of the operating chamber in comparison with an embodiment without the formation according to the invention is at least 25%, and is preferably between 33 and 50%. As a result, the inertia of the brake booster can be reduced effectively, without the flow behavior in the operating chamber and the structural design of the brake booster (for example, in relation to necessary operating spacings and the space requirement for structural elements) being influenced negatively.

Another embodiment according to an aspect of the invention provides that the formation is configured as at least one individual, separate component which is arranged within the operating chamber and is fastened on the rear wall. As a result, brake booster models which already exist can be modified or retrofitted simply and inexpensively without die changes or with only minimum die changes.

In the following text, an aspect of the invention is to be described in greater detail. Here, the description of generally known aspects and functions of a brake booster of the generic type will be dispensed with as far as possible, and merely the details which are relevant to the invention will be described. It is to be noted, furthermore, that the invention can be applied both to a single brake booster and to a tandem brake booster.

BRIEF DESCRIPTION OF THE DRAWINGS

In the drawing, in detail:

FIG. 1 shows the partial view of the rear side of a known pneumatic brake booster having a rear wall of smooth conical configuration of the booster housing in a perspective illustration (a), and an associated partial view in cross section X-X (b), FIG. 2 shows an embodiment according to an aspect of the invention of an improved brake booster in views (a, b) which are equivalent to those of FIG. 1, FIGS. 3 to 6 show, by way of example, the rear views of further embodiments according to an aspect of the invention of the brake booster in greatly simplified illustrations.

DETAILED DESCRIPTION OF THE PREFERRED EMBODIMENTS

Figure 7:
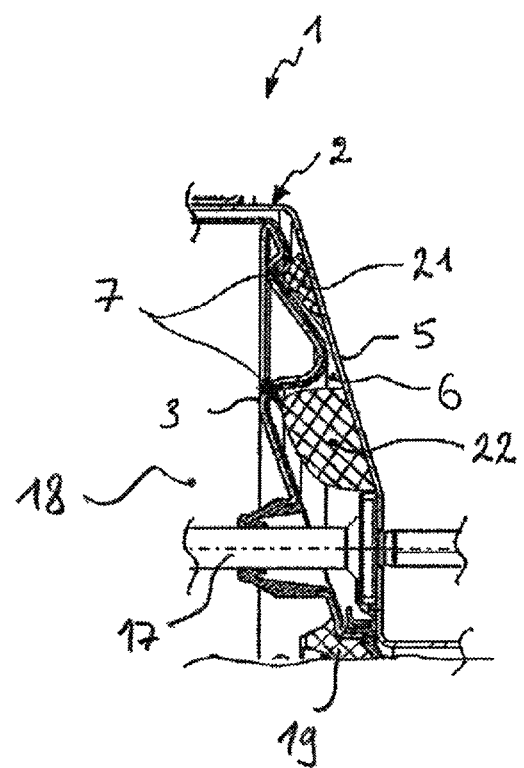
FIG. 7 shows another embodiment according to an aspect of the invention having separate components which are arranged within the operating chamber and are fastened to the rear wall.

View a) in FIG. 1 shows a rear region of a known embodiment of a pneumatic brake booster 1 of the generic type.

The approximately cylindrical structure 14 in the center comprises substantially an arrangement (not shown here) for actuating and controlling the brake booster 1. In a planar wall section 15 which is configured on the booster housing 2 radially on the inside and orthogonally with respect to the center axis A, four fastening means are arranged offset with respect to one another radially about the center axis A at an angular offset of in each case 90°. The fastening means serve to fasten the brake booster 1 to the vehicle and, in the embodiment which is shown, are represented by in each case two screws 16 and in each case two tie rod bolts 17 which penetrate the booster housing 2 on both sides. A different number or type of fastening means is likewise permissible within the scope of the invention, however.

The booster housing 2 of the known brake booster 1 has a rear wall 5 of slightly conical configuration with a smooth, planar surface.

View b) shows a partial section X-X through the booster housing 2 from view a) in the region of the rear wall 5 in the case of a non-actuated starting state of the operationally ready brake booster 1.

An operating wall 4 is arranged in the interior of the booster housing 2 such that it can be displaced to a limited extent axially along the center axis A. The operating wall 4 is of substantially annular or cup-shaped configuration with a central aperture, and is coupled radially on the inside to a control housing 19 in an airtight manner. A roller diaphragm 4 bears against the operating wall 3 on its side which faces the rear wall 5, and seals against the booster housing 2 radially on the outside at a point which is not shown here.

As a result, an operating chamber 6 is delimited in the booster housing 2 in the region between the operating wall 3 and the rear wall 5, and a vacuum chamber 18 is delimited on the opposite side of the operating wall 3. The two chambers 6, 18 are connected via a duct system (not shown here) within the control housing 19, said connection being opened and closed by means of at least one valve arrangement (likewise not shown here).

For the purpose of a damage-free absorption and a loss-free transmission of a pressure differential force which can be set during operation between the vacuum chamber 18 and the operating chamber 6, the cross section of the operating wall 3 is of undulating design, in order to increase the flexural stiffness of said operating wall 3.

In the non-actuated starting state which is shown here, the operating wall 3 is displaced up to the stop in the direction of the rear wall 5. In said operating state, the operating chamber 6 has its smallest possible minimum volume V.

In the case of a braking operation, the operating wall 3 is displaced away from the rear wall 5 in a manner which is driven by a pressure differential force which is generated between the chambers 6 and 18, with the result that the volume of the operating chamber 6 changes and becomes greater than the minimum volume V. In the case of an operation of this type, atmospheric air is let into the operating chamber 6, which atmospheric air has to be evacuated again after the braking operation has ended. In order that the operating wall begins to be displaced in the direction of the vacuum chamber 18 with a force-boosting action, a minimum threshold value has to be exceeded in the case of the pressure difference between the chambers 6 and 18. It is the case here that the greater the minimum volume V, the more atmospheric air has to be let into the operating chamber, in order to achieve the abovementioned minimum threshold value, and the longer it takes and the slower the response behavior of the brake booster 1 is. It is the case analogously that the more air has to be evacuated from the brake booster 1 again after the release of the brake, the longer it takes until the break-ready starting state is reached.

A brake booster 1 according to the invention which is shown in FIG. 2 in the respectively identical views as in FIG. 1 has, in a deviation from the above-described known embodiment, a formation 7 on its rear wall 5, which formation 7 serves to reduce the minimum volume V of the operating chamber 6.

The rear wall 5 is no longer of smooth design, but rather has a plurality of indented portions 8, 8' . . . and/or 9, 9' . . . which are configured so as to be directed in the direction of the operating wall 3. In the first embodiment according to the invention which is shown, in each case four indented portions 8, 8', 8", 8'" and/or 9, 9', 9", 9'" are arranged in the rear wall 5 along in each case two coaxial circular paths which are spaced apart radially from one another. Different arrangements and a different number of indented portions are permissible within the scope of the invention; in this regard, reference is to be made, in particular, to FIGS. 3-6, where different arrangement principles are illustrated. The flexural stiffness of the rear wall 5 is increased by the indented portions 8, . . . 9, . . . . Because the indented portions (for example, 8, 8', 8", 8'") are isolated from one another and are arranged at an angular offset with respect to one another, in each case a type of web 12 is formed between two respective adjacent indented portions (for example, 8'" and 8"). As a result, the flexural stiffness of the rear wall 5 is increased further.

The distribution of forces in the rear wall can be influenced in a targeted manner by way of a suitable pattern of indented portions and webs in the rear wall 5, in order, for example, to reduce stresses at the force action points.

The operating principle of the indented portions 8, . . . 9, . . . is illustrated in the sectional image Y-Y in view b). Here, for comparison purposes, the dashed line 20 shows an imaginary contour of a brake booster 1 which has not been improved and is identical apart from the formation 7 or the indented portions 8, . . . , 9 . . . .

By way of the indented portions 8, 9, the cross section of the rear wall 5 is adapted in regions approximately to the cross section of the operating wall 3. As a result, the minimum volume V is reduced considerably in comparison with a known embodiment. It has to be ensured here, however, that the atmospheric air can flow in between the rear wall 5 and the operating wall 5 in as unimpeded a manner as possible and can be distributed, in order that the entire surface area of the operating wall 3 is loaded as rapidly and uniformly as possible with the pressure differential force.

A sufficient spacing between the operating wall 3 and the booster housing 2 likewise has to be ensured generally, in order that no additional noise emissions occur during operation as a result of contact with the operating wall 3 on account of operationally induced vibrations and deformations. Against this background, the reduction in the minimum volume V (in comparison with a comparative embodiment having a linear cross-sectional profile of the rear wall 5 in accordance with the line 20) is to be preferably at least 25% and particularly preferably between 33% and 50%.

FIGS. 3 to 6 show a simplified illustration of different arrangements of the indented portions 8, . . . , 9, . . . on the rear wall 5. Here, the brake booster 1 is shown in each case in a rear view. Here, a suitable design of the formation 7 according to the invention is contingent substantially on the cross-sectional contour of the operating wall 3 in the respective specific brake booster application.

In the embodiment according to an aspect of the invention in accordance with FIG. 3, the formation 7 is configured as an individual, radially circumferential, contiguous indented portion 8 in the rear wall 5. The indented portion 8 runs on a circular path 10 concentrically with respect to the center axis A.

The embodiment according to an aspect of the invention in accordance with FIG. 4 has two radially circumferential indented portions 8, 9 instead of only one, in contrast to the embodiment in accordance with FIG. 3. The indented portions 8, 9 run on two concentric circular paths 10 and 11 which are spaced apart radially from one another. More than two concentric circular paths with indented portions which run thereon can likewise be provided within the scope of the invention.

In the embodiment according to an aspect of the invention in accordance with FIG. 5, two indented portions 8, 8' which are separated from one another by way of webs 12, 12' and/or are arranged at an angular offset with respect to one another are provided on a single circular path 10. In the embodiment which is shown, the indented portions 8 and 8' are of mirror-symmetrical design, in order to realize a uniform force flow through the rear wall 5.

In the embodiment according to an aspect of the invention in accordance with FIG. 6, in each case five indented portions 8, 8' . . . , 9, 9' . . . which are interrupted from one another by way of webs 12, 13 and/or are arranged at an angular offset with respect to one another are configured on two concentric circular paths 10, 11 which are spaced apart radially.

In other words, the embodiment which is shown represents a development of the embodiment in accordance with FIG. 4, in which the circumferential indented portions 8, 9 are interrupted by way of webs 12, 13 to form a plurality of isolated indented portions 8, 8' . . . , 9, 9' . . . .

Here, the number of five indented portions on a single circular path is merely by way of example; a different number of indented portions can be provided on each circular path within the scope of the invention.

FIG. 7 shows a cross section (equivalent to the view of FIG. 2b) of another embodiment according to an aspect of the invention of the brake booster 1. Here, the formation 7 is not embodied as indented portions which are configured in the rear wall 5, but rather by way of individual, separate, largely annular components 21 and 22. The components 21 and 22 are arranged spaced apart radially from one another in the operating chamber 6 and are fixed merely on the rear wall 5. The cross sections of the components 21, 22 are adapted in accordance with the respective complementary cross-sectional section of the operating wall 3 and/or the rear wall 5. Depending on the specific requirements, only one component or else more than two components 21, 22 can also be used within the scope of the invention.

LIST OF DESIGNATIONS

1 Brake booster
2 Booster housing
3 Operating wall
4 Roller diaphragm
5 Rear wall
6 Operating chamber
7 Formation
8 Indented portion
9 Indented portion
10 Circular path
11 Circular path 12 Web
13 Web
14 Structure
15 Wall section
16 Screw
17 Tie rod bolt
18 Vacuum chamber
19 Control housing
20 Line
A Center axis
V Minimum volume

The invention claimed is:

1. A pneumatic brake booster a hydraulic motor vehicle brake system, having a booster housing and at least one operating wall having an undulating shape which can be displaced to a limited extent in the booster housing along a center axis, the operating wall extending substantially radially with respect to the center axis and comprising a roller diaphragm for sealing against the booster housing and an operating chamber being delimited between the operating wall and a rear wall of the booster housing, there being a vacuum in the operating chamber in a brake-ready, unbraked starting state of the brake booster, and the operating chamber having a minimum volume here, and it being possible for the operating chamber to be connected to a surrounding atmosphere during a braking operation in order to boost the braking force, wherein the rear wall has at least one formation for reducing the minimum volume of the operating chamber by at least 25% relative to a minimum volume of a modified version of the operating chamber, the modified version of the operating chamber comprising one or more modifications to solely make the rear wall a smooth rear wall lacking the at least one formation, the at least one formation formed as an indented portion in the rear wall.

2. The brake booster as claimed in claim 1, wherein the indented portion is directed toward the operating wall.

3. The brake booster as claimed in claim 2, wherein the indented portion extends along at least one region of a circular path concentrically with respect to the center axis.

4. The brake booster as claimed in claim 3, wherein at least two indented portions are arranged on at least two concentric circular paths which are spaced apart radially from one another.

5. The brake booster as claimed in claim 3, wherein the at least one formation is designed as a single contiguous indented portion extending in a circle concentrically with respect to the center axis.

6. The brake booster as claimed in claim 3 wherein at least two indented portions which are isolated from one another are arranged on at least one circular path at an angular offset about the center axis from one another.

7. The brake booster as claimed in claim 6, wherein in each case four indented portions which are isolated from one another are arranged on each of the at least one circular path.

8. A pneumatic brake booster a hydraulic motor vehicle brake system, having a booster housing and at least one operating wall having an undulating shape which can be displaced to a limited extent in the booster housing along a center axis, the operating wall extending substantially radially with respect to the center axis and comprising a roller diaphragm for sealing against the booster housing and an operating chamber being delimited between the operating wall and a rear wall of the booster housing, there being a vacuum in the operating chamber in a brake-ready, unbraked starting state of the brake booster, and the operating chamber having a minimum volume here, and it being possible for the operating chamber to be connected to a surrounding atmosphere during a braking operation in order to boost the braking force, wherein the rear wall has at least one separate component which, arranged in the operating chamber, is fastened to the rear wall, the at least one separate component configured to reduce the minimum volume of the operating chamber by at least 25% relative to a minimum volume of a modified version of the operating chamber, the modified version of the operating chamber comprising one or more modifications to solely omit the at least one separate component.

9. The brake booster as claimed in claim 4, wherein each of the at least two indented portions includes at least two indented portions which are isolated from one another and are arranged on each of the at least two concentric circular paths at an angular offset about the center axis from one another.

* * * * *